(12) United States Patent
Hosoda

(10) Patent No.: US 10,148,644 B2
(45) Date of Patent: Dec. 4, 2018

(54) INFORMATION PROCESSING APPARATUS AND METHOD OF CONTROLLING THE SAME

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/471,110

(22) Filed: Aug. 28, 2014

(65) Prior Publication Data

US 2015/0067800 A1    Mar. 5, 2015

(30) Foreign Application Priority Data

Sep. 2, 2013  (JP) ................................ 2013-181564

(51) Int. Cl.
*H04L 29/06*   (2006.01)
*G06F 21/31*   (2013.01)
(Continued)

(52) U.S. Cl.
CPC ............ *H04L 63/083* (2013.01); *G06F 21/31* (2013.01); *H04N 1/4406* (2013.01);
(Continued)

(58) Field of Classification Search
CPC ....... H04L 9/32; H04L 9/3226; H04L 9/3239; H04L 63/08; H04L 63/083; G06F 21/31
(Continued)

(56) References Cited

U.S. PATENT DOCUMENTS

| | | | | |
|---|---|---|---|---|
| 7,581,243 B2 * | 8/2009 | Shigeeda | .............. | H04L 9/0863 380/278 |
| 8,055,904 B1 * | 11/2011 | Cato | ....................... | G06F 21/52 705/72 |

(Continued)

FOREIGN PATENT DOCUMENTS

| | | |
|---|---|---|
| CN | 101202668 A | 6/2008 |
| EP | 1 871 070 A1 | 12/2007 |

(Continued)

OTHER PUBLICATIONS

"Authentication—Dovecot Wiki", Aug. 28, 2013, retrieved from <URL: https://web.archive.org/web/20130828202000/http://wiki2.dovecot.org/Authentication?>.

(Continued)

*Primary Examiner* — Khang Do
(74) *Attorney, Agent, or Firm* — Fitzpatrick, Cella, Harper & Scinto

(57) ABSTRACT

An information processing apparatus capable of receiving an authentication request in accordance with a protocol of a plurality of protocols and a method of controlling the same are provided. The information processing apparatus stores a user identifier and a password for each user and a calculation method for each protocol, and when the apparatus receives an authentication request including authentication data from a remote computer in accordance with a protocol of the plurality of protocols, the apparatus obtains stored password corresponding to the authentication data which is included in the authentication request, obtains, stored calculation method corresponding to the protocol, converts the obtained password into a hash in accordance with the obtained calculation method, and verifies the authentication data with the hash.

18 Claims, 11 Drawing Sheets

(51) Int. Cl.
*H04N 1/44* (2006.01)
*G06F 21/60* (2013.01)

(52) U.S. Cl.
CPC ......... *H04N 1/4426* (2013.01); *H04N 1/4433* (2013.01); *G06F 21/608* (2013.01)

(58) Field of Classification Search
USPC .......................................................... 726/6
See application file for complete search history.

(56) References Cited

U.S. PATENT DOCUMENTS

| | | | | |
|---|---|---|---|---|
| 8,060,930 | B2* | 11/2011 | Lovat | G06Q 20/206 340/506 |
| 8,185,936 | B1* | 5/2012 | Reeves | H04L 9/0891 713/168 |
| 8,245,290 | B2 | 8/2012 | Hosoda | 726/17 |
| 2006/0005044 | A1* | 1/2006 | Uchikawa | H04L 63/0428 713/189 |
| 2006/0072531 | A1* | 4/2006 | Ewing | H04L 12/2854 370/338 |
| 2006/0089809 | A1* | 4/2006 | Satou | G06F 21/32 702/19 |
| 2006/0291453 | A1* | 12/2006 | Kuwahara | H04L 67/02 370/352 |
| 2008/0022090 | A1* | 1/2008 | Kishimoto | H04L 63/0428 713/156 |
| 2009/0024531 | A1* | 1/2009 | Yamahata | G06F 21/31 705/55 |
| 2009/0198811 | A1* | 8/2009 | Yasui | H04L 41/0213 709/223 |
| 2011/0072322 | A1* | 3/2011 | Suwabe | H04N 1/00225 714/57 |
| 2011/0289571 | A1* | 11/2011 | Yasuhara | G06F 21/31 726/7 |
| 2012/0179806 | A1* | 7/2012 | Torii | H04L 41/0213 709/223 |
| 2013/0111573 | A1* | 5/2013 | Mani | H04L 63/0815 726/8 |
| 2013/0219472 | A1* | 8/2013 | Hsu | H04L 63/0815 726/4 |
| 2014/0095682 | A1* | 4/2014 | Yablokov | H04W 12/08 709/223 |
| 2014/0298420 | A1* | 10/2014 | Barton | H04L 63/10 726/4 |
| 2015/0058618 | A1* | 2/2015 | Jung | H04L 63/083 713/155 |
| 2015/0143543 | A1* | 5/2015 | Phegade | H04W 12/06 726/29 |

FOREIGN PATENT DOCUMENTS

| | | |
|---|---|---|
| JP | 2002202955 A | 7/2002 |
| JP | 2004078622 A | 3/2004 |
| JP | 2006-195755 A | 7/2006 |
| JP | 2007188209 A | 7/2007 |
| JP | 2007299295 A | 11/2007 |
| JP | 2009245119 A | 10/2009 |
| KR | 10-2003-0081878 A | 10/2003 |
| KR | 10-2005-0119751 A | 12/2005 |
| KR | 10-0739245 B1 | 7/2007 |

OTHER PUBLICATIONS

Blumenthal et al., "User-based Security Model (USM) for Version 3 of the Simple Network Management Protocol (SNMPv3)," Network Working Group, RFC 3414, STD:62, Standards Track, the Internet Society, pp. 1-88, Dec. 2002.
Chinese Office Action issued in corresponding Chinese Patent Application No. 201410440836.3 dated Feb. 23, 2017.
Japanese Office Action Issued in corresponding Japanese Application No. 2013181564 dated Sep. 1, 2017.

\* cited by examiner

FIG. 4A

■ PLEASE ENTER USER NAME AND PASSWORD.

USER NAME: [ ]

PASSWORD: [ ]

[LOG IN]

FIG. 4B

■ EXPIRATION DATE PASSED.
PLEASE CHANGE PASSWORD.

NEW PASSWORD: [ ]

CONFIRM: [ ]

[UPDATE]

FIG. 4C

MENU

[COPY] [BOX]

(LOG OUT)

FIG. 4D

BOX

[USER 1] [DISPLAY MY DOCUMENTS] [DISPLAY ALL DOCUMENTS]

DOCUMENT NAME
DOCUMENT 1
DOCUMENT 2

[SCAN] [PRINT]

(LOG OUT)

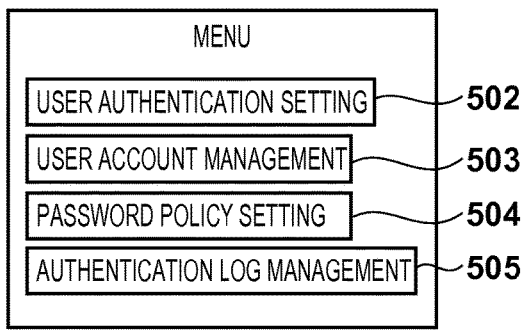

FIG. 6

| USER NAME | PASSWORD | AUTHORITY | PASSWORD LAST UPDATE DATE/TIME |
|---|---|---|---|
| Alice | **** | ADMINISTRATOR | 2013/2/1 10:00 |
| Bob | **** | GENERAL USER | 2013/2/2 10:00 |
| Carol | **** | GENERAL USER | 2013/2/3 10:00 |

```
Result UserAuthProcessing(
    String Caller;          //CALLER ~702
    String userName,        //USER NAME ~703
    Binary inputData,       //INPUT DATA(AUTHENTICATION DATA) ~704
    Binary outputData)      //OUTPUT DATA(VALUE CALCULATED BY CALCULATION MODE) ~705
RETURN VALUE      706
    SUCCESS                          //PROCESSING SUCCESS
    SUCCESS_NEED_PWD_CHANGE          //PROCESSING SUCCESS-PASSWORD
                                       CHANGE NECESSARY
    ERROR                            //PROCESSING FAILURE
    ERROR_NEED_PWD_CHANGE            //PROCESSING FAILURE-PASSWORD
                                       CHANGE NECESSARY
```

```
Struct AuthMethod {
    String Caller;           //CALLER
    String Algorithm;        //CALCULATION MODE
    String ProcessingType;   //AUTHENTICATION PROCESSING TYPE       708
    Bool PwdChangeable;      //EXISTENCE OR ABSENCE OF
                               CHANGE PASSWORD FUNCTION
}
Result UserAuthProcessingEx(
    AuthMethod authMethod,   //AUTHENTICATION MODE
    String userName,         //USER NAME
    Binary inputData,        //INPUT DATA(AUTHENTICATION DATA)
    Binary outputData)       //OUTPUT DATA(CALCULATION RESULT,
                               AUTHENTICATION RESULT
                               (AUTHORITY INFORMATION), ETC.
```

FIG. 7C

```
void WriteAuthenticationLog(String userName,Result code);
```

FIG. 8

| CALLER 801 | EXISTENCE OR ABSENCE OF CALLER CHANGE PASSWORD FUNCTION 802 | CALCULATION MODE 803 | AUTHENTICATION PROCESSING TYPE 804 |
|---|---|---|---|
| LOCAL UI | EXISTS | RAW | VERIFY |
| HTTP | DOES NOT EXIST | MD5 | VERIFY |
| SMB/CIFS | DOES NOT EXIST | MD4 | RETURN CALCULATION VALUE |
| SNMPv3 | DOES NOT EXIST | MD5 | RETURN CALCULATION VALUE | though
INFORMATION PROCESSING APPARATUS AND METHOD OF CONTROLLING THE SAME

BACKGROUND OF THE INVENTION

Field of the Invention

The present invention relates to an information processing apparatus and a method of controlling the same.

Description of the Related Art

Multi function peripherals (MFP: multi function peripheral) having functions such as those for scanning, printing, and communication are known. An MFP is equipped with an operation panel on a main body, and a user can use a copy function, a scanning function, or the like, of the MFP by operating the operation panel. Also, in recent years, MFPs are equipped with functions such as those for a file sharing server, a Web server, or the like, and a terminal on a network is able to access the server functions of the MFP using a communication protocol such as SMB (Server Message Block), HTTP, or the like. Also, MFPs are equipped with an MIB (Management Information Base), and a terminal on a network is able access the MIB of the MFP using SNMP v3 (RFC3414 (User-based Security Model (USM)) for version 3 of the Simple Network Management Protocol (SNMP v3)) which is known as a network device management protocol.

Furthermore, in recent years, MFPs are equipped with a user authentication mechanism for identifying a user that uses the MFP. In general, in cases where a single MFP is provided with a plurality of functions, communication protocols, or the like, the MFP is provided with a plurality of user authentication mechanisms corresponding to each of the functions, communication protocols, or the like. For example, there are cases in which the user authentication mechanisms for an operation panel, for a Web server, for a file sharing server, and for SNMP v3 are each different.

In cases where a single MFP is equipped with a plurality of user authentication mechanisms in this way, there are the following techniques of coordinating the authentication mechanisms. An approach for associating and synchronizing user information used mainly for authentication for an operation panel, and user information managed by a USM (User-based Security Model) of SNMP v3 is known (for example, Japanese Patent Laid-Open No. 2006-195755).

Also, in recent years, it is considered that similar security to that of a network terminal such as a personal computer is necessary for MFPs. For this reason, MFPs equipped with a user authentication mechanism corresponding to a password policy (password validity period, password complexity, settings/control of lockout), an authentication log(authentication success/failure logs records), or the like, have emerged.

In a case where a plurality of user authentication mechanisms exist in a single device, the following issues exist.

There are cases in which for each user authentication mechanism, an account for the same user is registered, and management of user information is cumbersome. Coordination between mechanisms for performing authentication of users becomes necessary, as in the invention recited in Japanese Patent Laid-Open No. 2006-195755, in order to make the same account useable for the plurality of user authentication mechanisms and not put a burden on the user.

From a security perspective, it is not preferable that a user authentication mechanism supporting a password policy, authentication logging, or the like, and a user authentication mechanism that does not support password policy, authentication logging, or the like, be mixed on a single device. For this reason, the issue exists that it is necessary for vendors that manufactures devices to incur development costs in order to provide an equivalent security function for a plurality of the user authentication mechanisms.

In a case where a plurality of user authentication mechanisms exists in a single device, because of the above described issues, a configuration in which a single user authentication mechanism is used commonly, in a case where communication protocols, functions, or the like, are different, is advantageous. However, there are specification differences in each user authentication method of each kind of communication protocol, and supporting processing related to user authentication for all of the communication protocols in a single user authentication mechanism is difficult. For example, because a scheme defined in a USM of SNMP v3 performs not only user authentication using the password of the user, but also performs cryptographic processing, signature/falsification detection processing, or the like, with a key generated based on the password, such processing is complex.

Also, for protocols that are defined by an RFC and generally well known, software modules or source code that implement the protocol are generally published. For this reason, vendors implementing a server are able to use existing software modules, source code, or the like. However, it will take a very large amount of effort and many man-hours in order for the vendors that manufacture devices to replace the existing software modules and source code that is different for each protocol with a user authentication mechanism common for all parts of the device with regards to user authentication. Also, in cases where specifications regarding password policy checking, password changing, and authentication log recording are not defined in a protocol, the existing published software modules and source code do not have such functions. Accordingly, the vendor that manufactures the device has to add/implement functions such as password policy checking, password changing, and authentication log recording in the existing software modules and source code, and there is a problem in that this takes a very large amount of effort and many man-hours.

SUMMARY OF THE INVENTION

An aspect of the present invention is to eliminate the above-mentioned problems with conventional technology.

A feature of the present invention is to provide a technique in which it is possible to integrate administration related to authentication of a user.

The present invention in its first aspect provides an information processing apparatus capable of receiving an authentication request in accordance with a protocol of a plurality of protocols, the apparatus comprising: a storage unit configured to store a user identifier and a password for each user and a calculation method for each protocol; a reception unit configured to receive an authentication request from a remote computer in accordance with a protocol of the plurality of protocols, the authentication request including authentication data; a control unit configured to:

(i) obtain, from the storage unit, a password corresponding to the authentication data which is included in the authentication request;

(ii) obtain, from the storage unit, a calculation method corresponding to the protocol;

(iii) convert the obtained password into a hash in accordance with the obtained calculation method; and (iv) verify the authentication data with the hash.

The present invention in its second aspect provides a method of controlling an information processing apparatus capable of receiving an authentication request in accordance with a protocol of a plurality of protocols, the method comprising: a storing step of storing a user identifier and a password for each user and a calculation method for each protocol into a memory; a reception step of receiving an authentication request from a remote computer in accordance with a protocol of the plurality of protocols, the authentication request including authentication data; a control step of:

(i) obtaining, from the memory, a password corresponding to the authentication data which is included in the authentication request;

(ii) obtaining, from the memory, a calculation method corresponding to the protocol;

(iii) converting the obtained password into a hash in accordance with the obtained calculation method; and (iv) verifying the authentication data with the hash.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A through FIG. 4D depict views for showing examples of user interfaces on which local UIs are displayed on a console unit according to the first embodiment.

FIG. 5A through FIG. 5F depict views for explaining setting user interfaces.

FIG. 6 depicts a view for showing an example of a data configuration of a user database according to the first embodiment.

FIG. 7A through FIG. 7C depict views for showing examples of APIs that a user authentication system has according to the first embodiment.

FIG. 8 depicts a view for showing an example of content of an authentication processing table according to the first embodiment.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
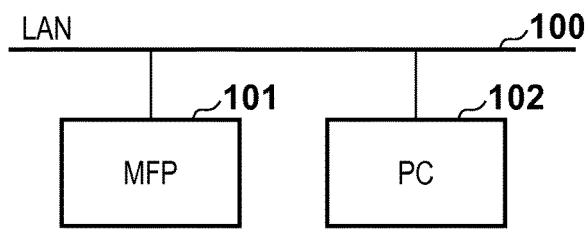
FIG. 1 depicts a simplified view showing a network configuration according to a first embodiment of the present invention.

FIG. 1 depicts a simplified view showing a network configuration according to a first embodiment of the present invention.

To a network (LAN) 100, an MFP 101, which is an example of an information processing apparatus according to the present invention, and a personal computer (PC) 102 are connected. The MFP 101 and the PC 102 are capable of performing communication with each other via the LAN 100. Here, the MFP 101 is a multi function peripheral equipped with a plurality functions such as those for scanning, printing and communication.

Figure 2:
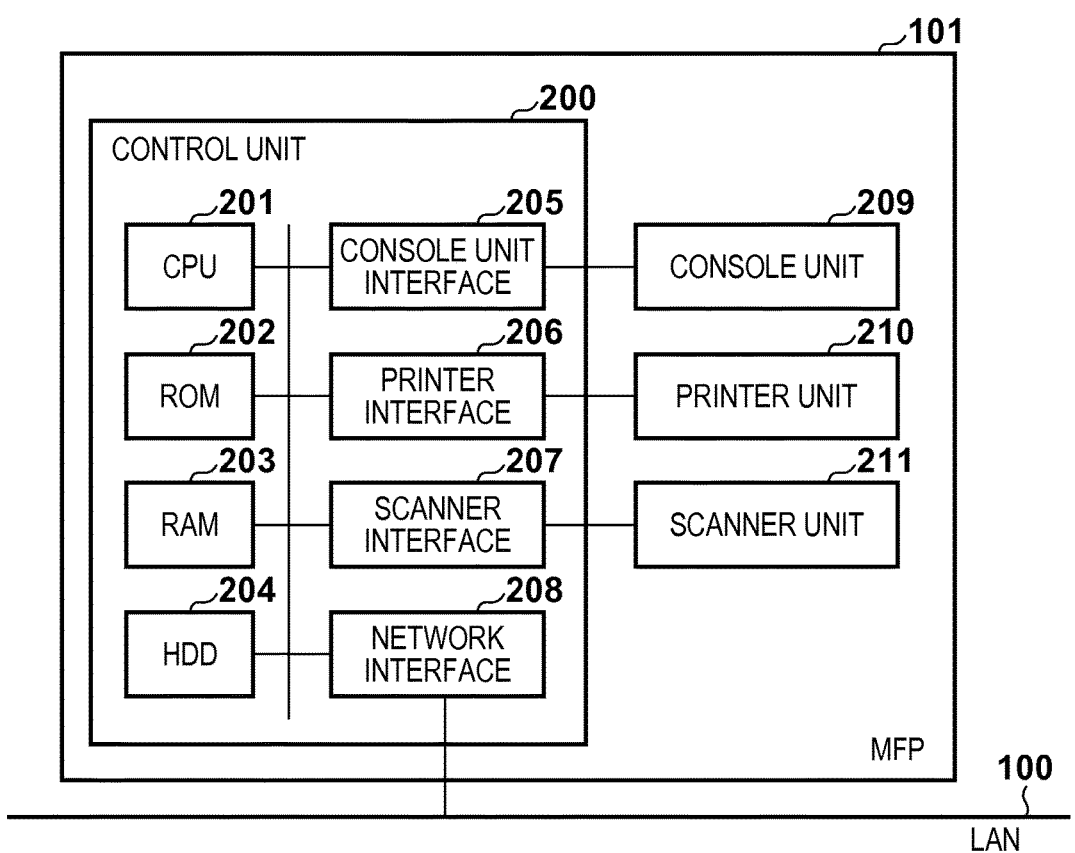
FIG. 2 is a block diagram for showing a hardware configuration of an MFP according to the first embodiment.

FIG. 2 is a block diagram for showing a hardware configuration of the MFP 101 according to the first embodiment.

A control unit 200, including a CPU 201, controls the overall operations of the MFP 101. The CPU 201 deploys an OS, control programs, or the like, which are installed in an HDD 204, into a RAM 203 in accordance with a boot program stored in a ROM 202, and the MFP 101 operates under a control of the CPU 201 which executes the programs. The RAM 203 is used as a temporary storage area such as a main memory, a work area, or the like, of the CPU 201. The HDD 204 stores image data, various programs, or the like. A console unit interface 205 connects a console unit 209 and the control unit 200. The console unit 209 is equipped with a display unit that operates as a touch panel. A printer interface 206 connects a printer unit 210 and the control unit 200. Image data to be printed by the printer unit 210 is transferred from the control unit 200 to the printer unit 210 via the printer interface 206, and printed onto a recording medium such as a sheet by the printer unit 210. A scanner interface 207 connects a scanner unit 211 and the control unit 200. The scanner unit 211 generates image data by scanning an image on an original, and supplies the image data to the control unit 200 via the scanner interface 207. A network interface 208 connects the control unit 200 (MFP 101) to the LAN 100. The network interface 208 transmits image data, information, or the like, to an external apparatus (for example, a Web server, or the like) connected to the LAN 100, and receives various information from the external apparatus on the LAN 100.

Note that because the PC 102 is constituted by a hardware configuration of a general-purpose computer that is generally known, explanation of the configuration of the PC 102 is omitted.

Figure 3:
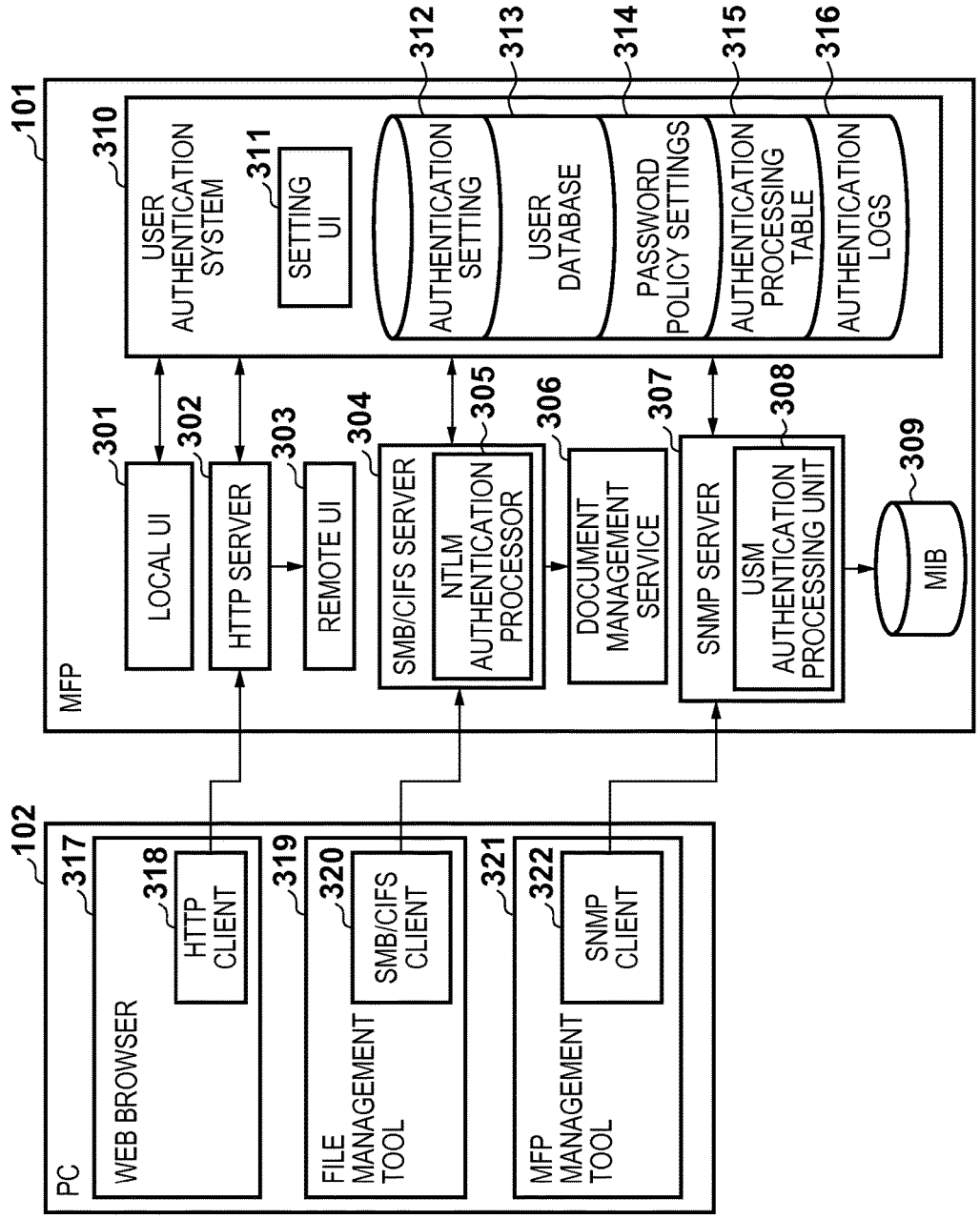
FIG. 3 is a block diagram for explaining a configuration of software of the MFP and a PC, and of data that the software manages according to the first embodiment.

FIG. 3 is a block diagram for explaining a configuration of software of the MFP 101 and the PC 102, and of data that the software manages according to the first embodiment. Note that arrow symbols of FIG. 3 represent a caller and a call target for functions in main use cases. Explanation is given below for functions of software and data that the software manages.

The software of the MFP 101 is stored as a program in the HDD 204 of the MFP 101, and the functions explained below are realized by this program being deployed into the RAM 203, and the CPU 201 executing the program.

A local UI (user interface) 301 displays user interfaces operable by a user on the console unit 209, and provides the user with functions that the MFP 101 has.

FIG. 4A through FIG. 4D depict views for showing examples of user interfaces which the local UI 301 displays on the console unit 209 according to the first embodiment.

For example, FIG. 4A depicts a view for illustrating an example of a user authentication screen for authenticating a user who uses the console unit 209. FIG. 4B represents an example of a change password screen for requesting that a user that authenticated on the user authentication screen of FIG. 4A change a password. FIG. 4C represents an example of a menu screen showing a function list of functions provided to a user that uses the console unit 209. FIG. 4D represents an example of a user interface screen for using a box function of the MFP 101. For example, a user is able to save image data obtained from the scanner unit 211 to the HDD 204 as an electronic document by using the user interface screen of FIG. 4D. Or, a user is able to print an electronic document obtained from the HDD 204 by using the printer unit 210.

The PC 102 is equipped with software such as a Web browser 317, a file management tool 319, an MFP management tool 321, or the like.

The Web browser 317 is equipped with a function in which the Web browser 317 communicates with an HTTP server 302 of the MFP 101 as an HTTP client 318. The HTTP server 302 calls a remote UI 303 upon receiving a request from the Web browser 317. The remote UI 303 provides a user interface defined in HTML to a user operating the Web browser 317. The HTTP server 302 returns HTML data obtained from the remote UI 303 to the Web browser 317 as a response to the request from the Web browser 317.

The file management tool 319 is equipped with a function in which the file management tool 319 communicates with an SMB/CIFS server 304 of the MFP 101 as an SMB/CIFS client 320. The SMB/CIFS server 304 is equipped with an NTLM authentication processor 305 for processing an NTLM (NT LAN Manager) authentication protocol. The SMB/CIFS server 304 calls a document management service 306 when the SMB/CIFS server 304 receives a request such as that for browsing of a file, for file saving, or the like, from the file management tool 319. The document management service 306 is equipped with functions for performing browsing or updating of electronic documents (files having a file extension such as PDF, JPEG, PNG, DOC, or the like) saved in the HDD 204, and performing saving of new files, or the like.

The MFP management tool 321 is equipped with a function for accessing an MIB 309 that the MFP 101 is provided with by accessing an SNMP server 307 of the MFP 101 as an SNMP client 322. The SNMP server 307 is provided with a USM authentication processing unit 308 for processing a user authentication protocol defined by a USM of SNMP version 3. The SNMP server 307 references data saved in the MIB 309 and performs settings when the SNMP server 307 receives an access request from the MFP management tool 321 of the PC 102.

A user authentication system 310 is equipped with a mechanism for authenticating a user that uses the MFP 101. Explanation is given below of details of functions that the user authentication system 310 has.

The user authentication system 310 is provided with a setting UI 311 for a user that manages the MFP 101 to perform setting related to user authentication of the MFP 101. The setting UI 311 can be configured as a user interface described in HTML that is usable from the Web browser 317 of the PC 102 similarly to the remote UI 303.

FIG. 5A through FIG. 5F depict views for explaining user interfaces of the setting UI 311.

FIG. 5A represents an example of a menu screen. When any one of the items denoted by numerals 502-505 is designated on a screen of FIG. 5A, processing transitions to a screen for the designated function. A user authentication setting 502 is a user interface for setting a user authentication function of the MFP 101 to be ON or OFF. When the user authentication setting 502 is designated on the screen of FIG. 5A, processing transitions to a screen of FIG. 5B. On the screen of FIG. 5B, a user is able to set user authentication to be ON or OFF, and the user authentication system 310 stores content that is set here as an authentication setting 312 in the HDD 204. Each software module is able to reference the user authentication ON/OFF setting by accessing the authentication setting 312. In the example of FIG. 5B, user authentication is set to be ON (user authentication is enabled).

A screen of FIG. 5C is displayed by a user account management 503 being designated in the screen of FIG. 5A. In the screen of FIG. 5C, a user is able to register and edit a user name and authority of a user. A screen of FIG. 5D represents an example of a screen that is displayed when register or edit is designated in the screen of FIG. 5C. A user is able to perform registration, editing, or the like, of a user account via the user interface screens shown in FIG. 5C and FIG. 5D. The user authentication system 310 manages information related to a user account registered using the screen of FIG. 5D by storing the information in a user database 313 of the HDD 204. A user name "Alice" is registered as an administrator in the screen of FIG. 5D, and also a password corresponding to the user name is registered.

FIG. 6 depicts a view for showing an example of a data configuration of the user database 313 according to the first embodiment.

Here a user name 601, a password 602, and an authority 603 are registered via the user interface screens shown in FIG. 5C and FIG. 5D. A password last update date/time 604 represents a date and time at which a password is registered or updated via the screen of FIG. 5D.

A screen of FIG. 5E is displayed by a password policy setting 504 being designated in the screen of FIG. 5A. FIG. 5E represents an example of a user interface screen for setting a policy related to passwords. For example, "no validity period", "30 days", and "90 days" can be selected as password validity periods. Also, it can be selected whether "three characters or more" (a setting for forcing a password to be three characters or more), "including symbol" (a setting for forcing a symbol to be included in a password), or the like, is valid/invalid, as settings for password complexity. The user authentication system 310 stores items set via the screen of FIG. 5E as password policy settings 314 in the HDD 204.

A screen of FIG. 5F is displayed by an authentication log management 505 being designated in the screen of FIG. 5A. FIG. 5F represents a user interface screen for managing log records of authentication results. In FIG. 5F, it is possible to view authentication logs 316 that the user authentication system 310 records to the HDD 204. In this screen, a user name, an authentication mode, a date and time at which the authentication is performed, and an authentication result (OK or NG (no good)), which are registered in the authentication logs 316, are displayed.

FIG. 7A through FIG. 7C depict views for showing examples of APIs (Application Programming Interfaces)

that the user authentication system 310 is provided with according to the first embodiment.

By other software modules calling an API 701 of FIG. 7A, an authentication request requesting a user authentication can be issued to the user authentication system 310. The user authentication system 310 determines operation of the API 701 by referencing an authentication processing table 315 based on information of a caller 702.

FIG. 8 depicts a view for showing an example of content of the authentication processing table 315 according to the first embodiment.

The authentication processing table 315 stores a combination of caller information 801, an existence or absence of a change password function 802 of a caller, a calculation mode 803, an authentication processing type 804, or the like. In the caller information 801, a caller communication protocol, which is an issue origin of an authentication request, is registered. Existence or absence of a change caller password function 802 represents whether or not a software module of a caller comprises a password change function. For example, because for the local UI 301, which controls an interface with a user, the existence or absence of a change caller password function 802 is "exists", and a function for displaying the change password screen operation screen of FIG. 4B exists.

Meanwhile, for communication protocol such as HTTP, SMB/CIFS, and SNMP v3, a protocol for changing a password it is not defined. For this reason, the HTTP server 302, the SMB/CIFS server 304 and the SNMP v3 server 307 do not have a function for requesting a password change. The calculation mode 803 represents calculation algorithms that the API 701 uses to convert from a password into another value. "RAW" represents using the password as is without processing the password. "MD4" represents calculating an MD4 (Message Digest Algorithm 4) digest (hash value) from the password. "MD5" represents calculating an MD5 (Message Digest Algorithm 5) digest (hash value) from the password. The calculation mode 803 is not limited to "MD4", "MD5", or the like, and may be any kind of calculation mode as long as the calculation mode 803 is a known calculation mode that the user authentication system 310 implements. For example, calculation algorithms such as HMAC (Keyed-Hashing for Message Authentication Code) (RFC 2104), the SHA (Secure Hash Algorithm), or the like, are generally known. Configuration may be taken such that the user authentication system 310 is provided with a calculation algorithm of NTLM or a USM of SNMP version 3 as a calculation mode. The authentication processing type 804 categorizes operation of the API 701 into either "verify" or "calculation value return". The "verify" represents the API 701 performing an operation of verifying a value calculated from a password, against the authentication data 704 received from the caller, and returning a verification result. The "calculation value return" represents the API 701 performing an operation of calculating a different value to the password with the algorithm indicated by "calculation mode" 803 from the password, and returning the calculated value (output data shown by a numeral 705 of FIG. 7A).

Next, explanation is given below of a meaning of return values 706 in FIG. 7A that the API 701 returns.

SUCCESS

SUCCESS represents that processing of the API 701 succeeds. In a case in which the authentication processing type 804 is "verify", SUCCESS represents that user authentication processing succeeds. In a case in which the authentication processing type 804 is "calculation value return", a value calculated from the password is stored in the output data 705 in FIG. 7A and returned.

SUCCESS_NEED_PWD_CHANGE

SUCCESS_NEED_PWD_CHANGE represents that it is necessary for the user to change the password because, though the processing of the API 701 succeeds, the password does not satisfy the password policy. In a case where there is a caller password change function, this value is returned.

ERROR

ERROR represents that processing of the API 701 is suspended. In a case in which the authentication processing type 804 is "verify", ERROR represents that user authentication processing fails. In a case where the authentication processing type 804 is "calculation value return", a value calculated from the password is not returned.

ERROR_NEED_PWD_CHANGE

ERROR_NEED_PWD_CHANGE represents that because the password does not satisfy the password policy, the processing of the API 701 is suspended. In a case where there is no caller password change function, this value is returned.

The specification of the above explained API 701 is only one example, and the present invention is not limited this example. For example, configuration may be taken so as to obtain a portion or all of the information of the authentication processing table 315 shown in FIG. 8 from the caller of the API. In a case where only a portion of the information is obtained from the caller, configuration is taken so as to obtain only the information required to determine the operation of the API from the authentication processing table 315. By configuring so that the authentication processing table 315 is editable from outside, it becomes possible to flexibly support modification or addition of software modules that the API uses.

Another example of an API is shown in FIG. 7B. The API of FIG. 7B uses parameters 708, and makes all of the information of the authentication processing table 315 as shown in FIG. 8 to be obtainable from the caller. In this way, in a case where configuration is taken so as to obtain all of the information from the caller, it is not necessary for the user authentication system 310 to reference the authentication processing table 315. Also, it is not necessary to limit the API for authentication processing to one API, and a plurality of APIs may be prepared for each combination of processing envisioned in advance. In the explanation below, explanation is given with the API 701 shown in FIG. 7A being used as the API for authentication processing.

An API of FIG. 7C obtains a result of a user authentication that the software module executes, and records a log in the authentication logs 316.

Figure 9:
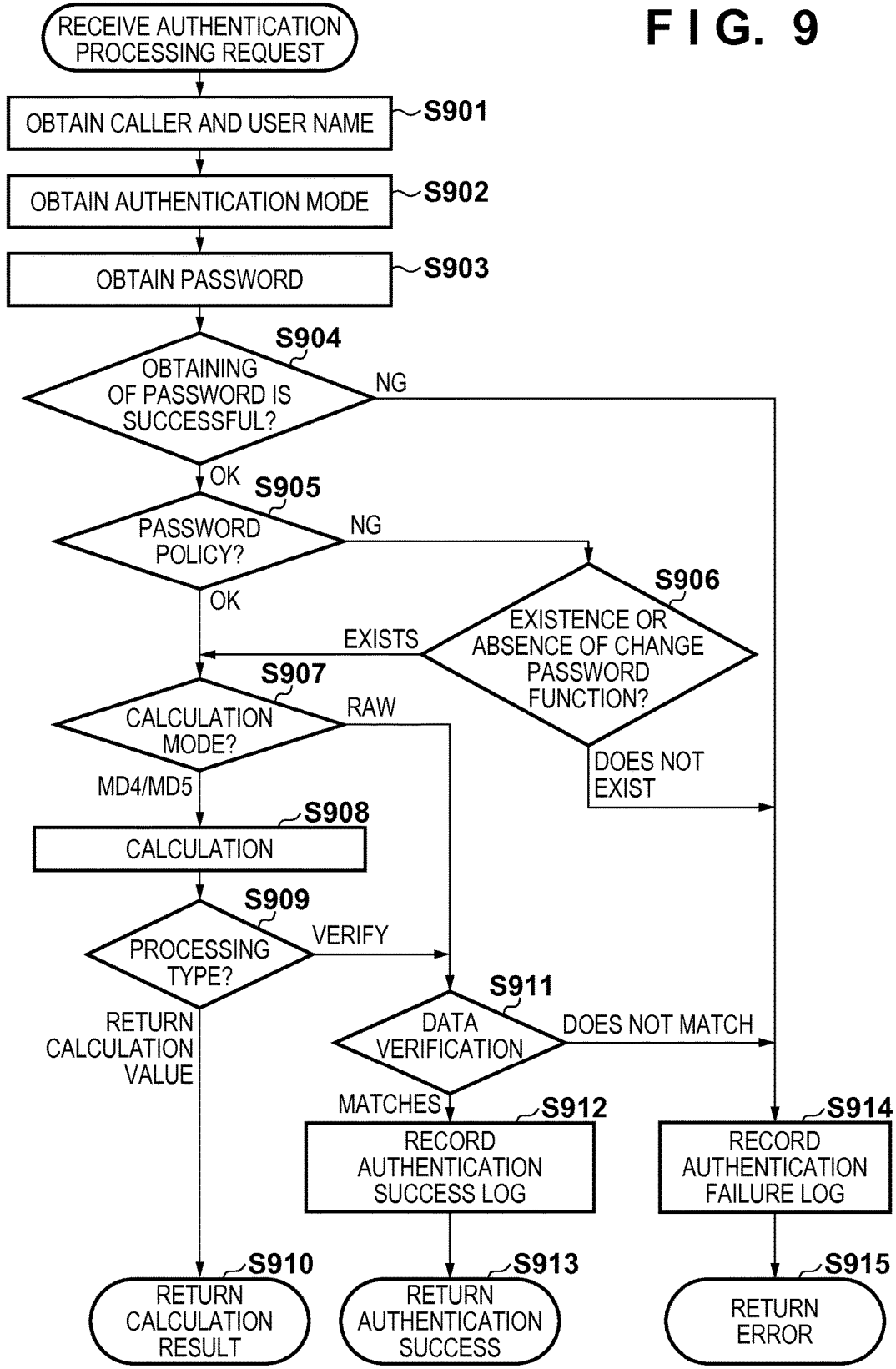
FIG. 9 is a flowchart for describing an operation of the user authentication system when the API of FIG. 7A is called in the MFP according to the first embodiment.

FIG. 9 is a flowchart for describing an operation of the user authentication system 310 when, in the MFP 101, a software module calls the API 701 of FIG. 7A according to the first embodiment. Note that a program that executes this processing is deployed into the RAM 203 upon execution, and executed under the control of the CPU 201.

This processing is initiated by the API 701 of FIG. 7A being called, and the user authentication system 310 receiving a request for processing related to user authentication. Firstly, in step S901, the user authentication system 310 obtains information of the caller 702 and the user name 703 (user identifier) from the parameters of the API 701. Next, the processing proceeds to step S902, and the user authentication system 310, referencing the authentication processing table 315 based on the information of the caller 702, obtains the authentication mode (existence or absence of a change password function, calculation mode, authentication processing type). Next, the processing proceeds to step S903, and the user authentication system 310 determines whether or not the user name obtained in step S901 is registered in the user database 313 (FIG. 6). In a case where the user name is registered, the password 602 and the password last update date/time 604 registered in association with the user name are obtained. Meanwhile, in a case where the user name is not registered in the user database 313 and the password could not be obtained in step S903, the user authentication system 310 determines an authentication failure in step S904, because the user authentication system 310 cannot obtain the password, and the processing proceeds to step S914. In step S914, the user authentication system 310 records an authentication failure log. Then, the processing proceeds to step S915, the user authentication system 310 returns an error (ERROR) to the caller of the API 701, and the processing completes.

Meanwhile, in a case where obtaining of the password succeeds in step S904, the processing proceeds to step S905, and the user authentication system 310, referring to the password policy settings 314, determines whether or not the obtained password satisfies a validity period, the complexity setting, or the like. Here, in a case where the validity period of the password is expired, or the complexity is not satisfied, the processing proceeds to step S906, and the user authentication system 310 also determines the existence or absence of a caller change password function. Here in a case where the change password function exists, the processing proceeds to step S907, and the processing continues. However, in a case where it is determined that the change password function does not exist in step S906, the processing proceeds to step S914, and an authentication failure log is recorded, and then in step S915, an error (ERROR_NEED_PWD_CHANGE) is returned to the caller of the API 701, and the processing completes.

In a case where, in step S905, the user authentication system 310 determines that the obtained password satisfies the validity period, and the complexity setting, or in a case where, in step S906, it is determined that the caller change password function exists, the processing proceeds to step S907. In step S907, the user authentication system 310, referring to the authentication processing table 315, confirms the calculation mode 803 set for the caller. In a case where the calculation mode here is not "RAW" (for example, a case of "MD4" or "MD5"), the processing proceeds to step S908, and calculation processing is performed, based on the obtained password, in accordance with the calculation mode. For example, an MD4 digest or an MD5 digest is calculated here in accordance with an algorithm of MD4 or MD5. Then, the processing proceeds to step S909, and the user authentication system 310, referencing the authentication processing table 315, confirms the authentication processing type 804 set for the caller. Here, in a case where the authentication processing type 804 is "calculation value return", the processing proceeds to step S910, the user authentication system 310 stores the calculated value in the output data 705, and returns processing success (SUCCESS), and the processing completes. Also, in a case where the password policy check of step S905 fails here, something to that effect (SUCCESS_NEED_PWD_CHANGE) is returned.

Meanwhile, in a case where the user authentication system 310, in step S909, determines that the authentication processing type 804 is "verify", the processing proceeds to step S911, and the user authentication system 310 verifies the authentication data 704 (FIG. 7A) against the value calculated in step S908. In a case where a result of the verification is that the authentication data 704 and the calculated value match, the processing proceeds to step S912, the user authentication system 310 records an authentication success log, the processing proceeds to step S913, processing success (SUCCESS) is returned to the caller of the API, and the processing completes. In this case, in a case where the password policy check of step S905 is NG, something to that effect (SUCCESS_NEED_PWD_CHANGE) is returned.

Meanwhile, in a case where it is determined that the result of the verification in step S911 is that the authentication data 704 and the calculated value do not match, then an authentication failure is determined, the processing proceeds to step S914, and the user authentication system 310 records an authentication failure log. Then, in step S915, an error (ERROR) is returned to the caller of the API, and the processing completes.

Next, explanation will be given for an operation example for when user authentication on the MFP 101 is set to be ON, and various software modules execute user authentication using the user authentication system 310. Here, explanation will be given for a case in which the software modules are the local UI 301, the HTTP server 302, the SMB/CIFS server 304, and the SNMP server 307.

FIG. 10A through FIG. 10D depict views for showing relationships of software modules when the MFP 101 performs user authentication along with a flow of data according to the first embodiment.

Figure 10A:
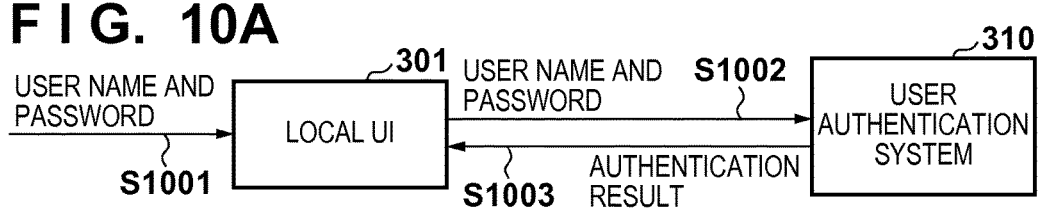
FIG. 10A through FIG. 10D depict views for showing relationships of software modules when the MFP performs user authentication along with a flow of data according to the first embodiment.

FIG. 10A depicts a view for explaining a case where the local UI 301 performs user authentication using the user authentication system 310. In FIG. 10A, a user authentication screen is displayed on the operation screen, and the user authentication is requested for a user using the MFP 101. The local UI 301, in step S1001, obtains a user name and a password that the user inputs into the user authentication screen of FIG. 4A. Also, in step S1002, the local UI 301 makes a request for authentication processing by passing the user name and the password to the user authentication system 310 via the API 701 of FIG. 7A. With this, the user authentication system 310, referencing the authentication processing table 315 performs a password policy check, a password verification, and an authentication log recording, and in step S1003, replies to the local UI 301 with a processing result.

Here, the local UI 301 displays the menu screen of FIG. 4C, for example, and permits the usage of a function of the MFP 101 to the user in a case where the result is successful (SUCCESS). On the other hand, in a case where the authentication result is NG (SUCCESS_NEED_PWD_CHANGE), the change password screen of FIG. 4B is displayed on the operation screen since the password policy check is NG, and a change of password is requested of the user. Also, in a case where the authentication result is an error (ERROR), the user authentication screen of FIG. 4A is displayed, and the user is requested to re-enter authentication information.

Figure 10B:
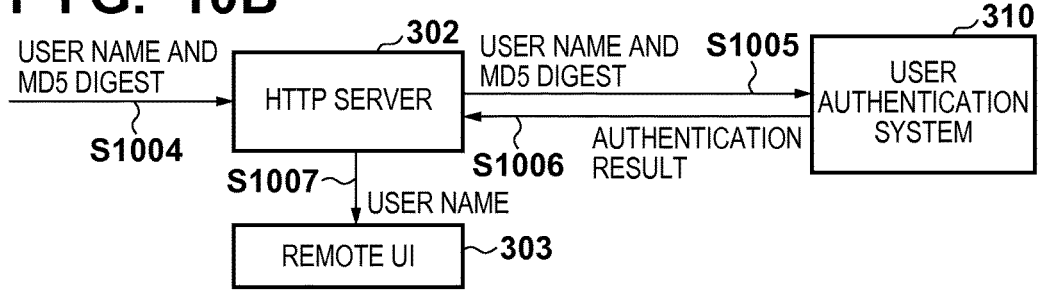

Next, explanation will be given of an operation of the HTTP server 302 of the MFP 101 with reference to FIG. 10B. FIG. 10B depicts a view for explaining a case where the HTTP server 302 performs user authentication using the user authentication system 310.

The HTTP server 302, in step S1004, receives an HTML obtaining request including an HTTP digest authentication (RFC 2617) from the Web browser 317. With this, the HTTP server 302 obtains a user name and an MD5 digest from a packet, and, in step S1005, making a request for authentication processing to the user authentication system 310 via the API 701. With this, the user authentication system 310, referencing the authentication processing table 315, performs a password policy check, and verification processing verifying against a MD5 digest calculation, performs a recording of an authentication log, and in step S1006, replies with an authentication result. The HTTP server 302, in a case where the authentication result is successful (SUCCESS), transmits an HTML obtaining request to the remote UI 303 in step S1007. With this, the remote UI 303 obtains the information of the user who authenticated from the HTTP server 302, and performs HTML provision and access control in accordance with the user. Meanwhile, in a case where the result is failure (ERROR/ERROR_NEED_PWD_CHANGE), the HTTP server 302 makes a notification of the error to the Web browser 317.

Figure 10C:
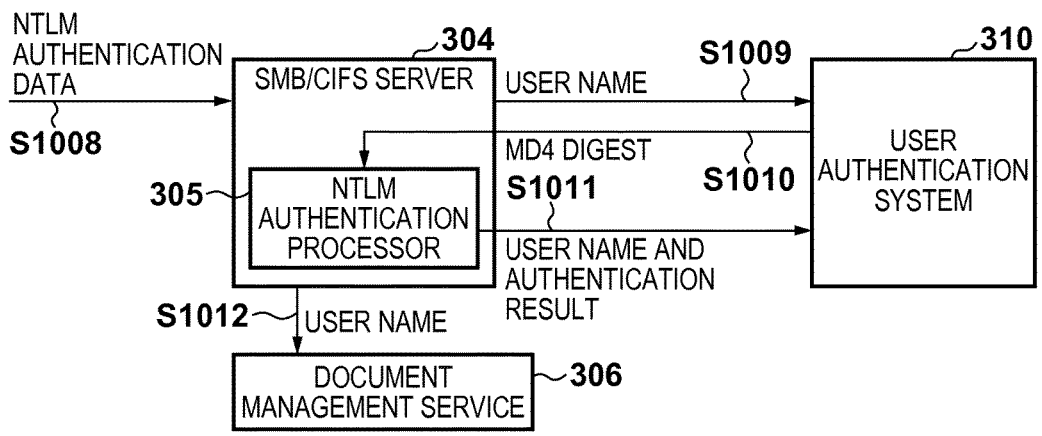

Next, explanation will be given of an operation of the SMB/CIFS server 304 of the MFP 101 with reference to FIG. 10C. FIG. 10C depicts a view for explaining a case where the SMB/CIFS server 304 performs user authentication using the user authentication system 310.

The SMB/CIFS server 304 receives a packet including authentication data of an NTLM data format from the file management tool 319 of the PC 102 in step S1008. With this, the SMB/CIFS server 304 obtains a user name from the packet, and in step S1009, makes a request for authentication processing to the user authentication system 310 via the API 701. With this, the user authentication system 310, referencing the authentication processing table 315, performs a password policy check, and an MD4 digest calculation, and in step S1010 returns the processing result along with the MD4 digest. With this, in the SMB/CIFS server 304, the NTLM authentication processor 305 performs NTLM authentication processing using an MD4 digest obtained from the user authentication system 310 and NTLM authentication data obtained from the packet. Then, the SMB/CIFS server 304 obtains an authentication result produced by the NTLM authentication processor 305, and in step S1011, the user name and the authentication result are informed to the user authentication system 310 via the API of FIG. 7C.

In a case where the authentication of the user here succeeds, the SMB/CIFS server 304 permits access to the document management service 306 from the file management tool 319 of the PC 102 after that. The document management service 306 obtains user information from the SMB/CIFS server 304 in step S1012, and performs a service provision, access control, or the like, in accordance with the user. Meanwhile, in a case where the authentication of the user fails, the SMB/CIFS server 304 informs the error to the file management tool 319 of the PC 102.

Figure 10D:
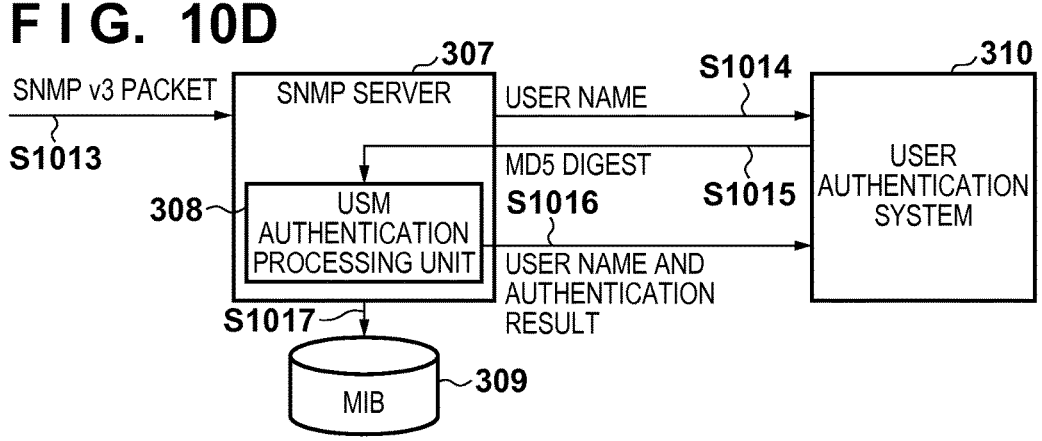

Next, explanation will be given of an operation of the SNMP server 307 of the MFP 101 with reference to FIG. 10D. FIG. 10D depicts a view for explaining a case where the SNMP server 307 performs user authentication using the user authentication system 310.

The SNMP server 307, in step S1013, receives a packet including authentication data in accordance with a USM (RFC3414) of SNMP v3 from the MFP management tool 321 of the PC 102. Then, the SNMP server 307 obtains a user name from this packet, and makes a request for authentication processing to the user authentication system 310 through the API 701 in step S1014. With this, the user authentication system 310, referencing the authentication processing table 315, performs a password policy check, and an MD5 digest calculation, and in step S1015 returns the processing result along with the MD5 digest. With this, in the SNMP server 307, the USM authentication processing unit 308 performs NTLM authentication processing using the MD4 digest obtained from the user authentication system 310 and NTLM authentication data obtained from the packet. Then, the SNMP server 307 obtains an authentication result of the USM authentication processing unit 308, and in step S1016, makes a notification to the user authentication system 310 of the user name and the authentication result via the API of FIG. 7C. In a case where the user authentication succeeds, the SNMP server 307, in step S1017, performs access of the MIB 309 that the MFP management tool 321 requests. The SNMP server 307 performs access control for access to the MIB 309 in accordance with the user. Meanwhile, in a case where the user authentication fails, the SNMP server 307 notifies the MFP management tool 321 of the PC 102 of the error.

By the first embodiment, as explained above, because a user authentication mechanism of the MFP 101 is realized by the single user authentication system 310, management of settings related to user authentication and a burden of management of user accounts can be reduced.

Also, by the first embodiment, because password security policy and an authentication log printing function are provided for all access paths, it is possible to adapt equivalent security functions to all access paths.

Also, it is not always necessary for the software modules that use the user authentication system 310 of the MFP 101 to support a password security policy, authentication log recording, or the like, and so there is the advantage that a reconstruction costs of existing software module or source code is not incurred.

Furthermore, by the first embodiment, it is possible for the user authentication system 310 and software modules that use the user authentication system 310 to perform distribute processing related to user authentication. For this reason, there is the effect that it is possible to configure a device in which managements related to the user authentication are integrated while using existing software modules and source code to the maximum.

Second Embodiment

The previously described user authentication system 310 does not always have to be within the MFP 101, and configuration may be taken such that the user authentication system 310 is a separate node on a network.

Figure 11:
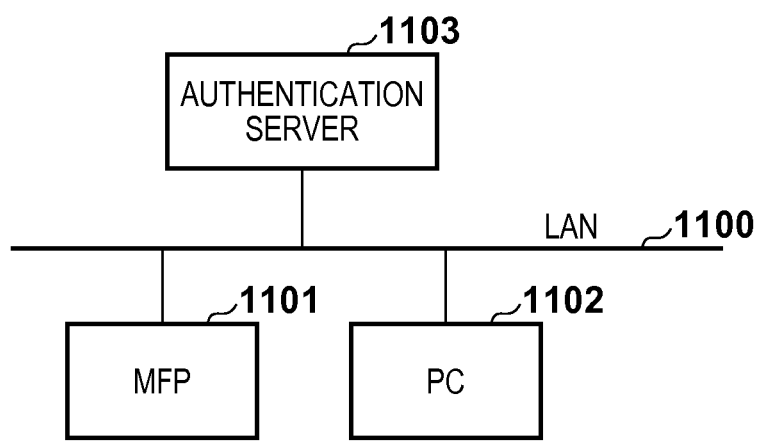
FIG. 11 depicts a view for showing an example of a system configuration in which the user authentication system is constructed as an authentication server according to a second embodiment of the present invention.

FIG. 11 depicts a view for showing an example of a system configuration in which the user authentication system is constructed as an authentication server according to a second embodiment of the present invention.

Here, an MFP 1101, a PC 1102 and an authentication server 1103 are connected via a LAN 1100. Note that because the hardware configurations of the MFP 1101 and the PC 1102 are the same as the hardware configurations of the MFP 101 and the PC 102 according to the previously described first embodiment, their explanation will be omitted.

Figure 12:
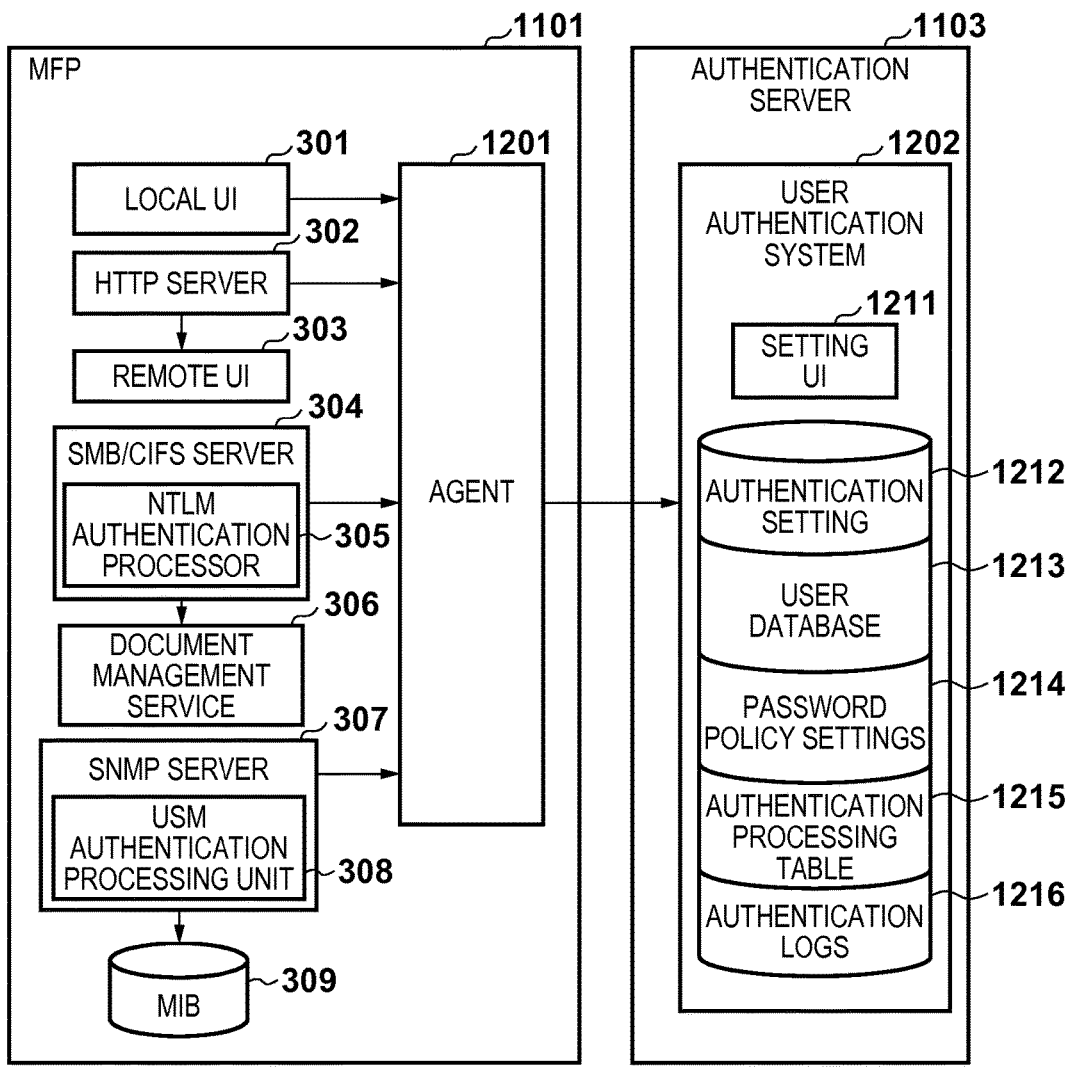
FIG. 12 is a block diagram for showing a software configuration of the MFP and the authentication server according to the second embodiment.

FIG. 12 is a block diagram for showing a software configuration of the MFP 1101 and the authentication server 1103 according to the second embodiment. Because the configuration of the PC 1102 is the same as the configuration of the PC 102 of the previously described first embodiment, explanation is omitted. Note that portions common to the previously described FIG. 3 are denoted by the same reference numerals, and their explanation is omitted. Also, because arrangements indicated by reference numerals 1211-1216 of the user authentication server 1103 have the same functions as the arrangements denoted by reference numerals 311-316 of the previously described FIG. 3, their explanation is omitted.

The MFP 1101 is equipped with an agent 1201 for communicating with the authentication server 1103. The authentication server 1103 is equipped with a user authentication system 1202. The MFP 1101 and the authentication server 1103 are able to establish a trust relationship by exchanging secret encryption keys to be used for communication in advance. Certificates that a third party issued such as a client certificate, a server certificate or the like, using a PKI technique, may be exchanged.

The agent 1201 is provided with an API (numeral 701 in FIG. 7A or FIG. 7C, or the like) equivalent to the API that the user authentication system 1202 has. The agent 1201 obtains a processing result by calling an API of the user authentication system 1202 via communication on the network when an API is called from another software module. Because it is necessary that the information that flows over the network here be kept secret, encryption is performed using the keys exchanged in advance. In this way, by configuring the user authentication system 1202 to be an independent node (authentication server) on a network, a user authentication system 1202 usable from a plurality of MFPs can be provided.

As explained above, by virtue of this embodiment, the following effects can be obtained.

By making realizable a user authentication mechanism as a single user authentication system, burdens of management of settings related to user authentication and of management of user accounts can be reduced.

It is possible to apply the same user authentication mechanism to all access paths for a device using the user authentication system.

It is possible to reuse existing software modules and source code, and a device that can perform user authentication with comparably less effort and man-hours can be configured.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181564, filed Sep. 2, 2013, which is hereby incorporated by reference herein in its entirety.

What is claimed is:

1. An information processing apparatus, the apparatus comprising:
   a plurality of different kinds of servers each of which communicates with an application different from that of the other servers using a communication protocol different from that of the other servers;
   a local UI (user interface) that provides a user interface for providing a user with functions including at least a print function of the information processing apparatus, wherein the user interface is displayed on a display unit of the information processing apparatus;
   an authentication information storage unit that stores authentication processing methods for each of the plurality of servers;
   a memory device that stores a set of instructions; and
   at least one processor coupled to the authentication information storage unit and the memory device, wherein the at least one processor executes the instructions to perform the steps of:
   storing, in a user information storage unit, at least one credential associated with a user identifier, wherein the at least one credential is common among the plurality of different kinds of servers;
   receiving a request for authentication processing of a user for one of the servers, the request including a user identifier associated with the user;
   obtaining, from the authentication information storage unit, an authentication processing method for the server for which the authentication processing is requested;
   obtaining a credential stored in the user information storage unit and associated with the user identifier included in the request; and
   providing a user authentication system that performs the authentication processing using the obtained credential in accordance with the obtained authentication processing method for the server,
   wherein, in a case where the user authentication system receives a user identifier for performing authentication processing from a first server among the plurality of servers, the user authentication system generates first authentication data using the obtained credential that is common among the plurality of different kinds of servers, performs the authentication processing for the user using the first authentication data, and replies with a result of authentication processing to the first server,
   in a case where the user authentication system receives a user identifier for performing authentication processing from a second server among the plurality of servers, the user authentication system generates, using the obtained credential that is common among the plurality of different kinds of servers, second authentication data necessary for the second server to perform the authentication processing for a user corresponding to the user identifier received from the second server and to reply an authentication result to the user authentication system, and replies with the second authentication data to the second server, and
   in a case that the user authentication system receives a user identifier for performing authentication processing via the local UI, the user authentication system performs the authentication processing for the user using the obtained credential that is common among the plurality of different kinds of servers and replies with a result of the authentication processing to the local UI.

2. The information processing apparatus according to claim 1, wherein
the different kinds of servers includes at least an HTTP (Hypertext Transfer Protocol) server as the first server and an SMB/CIFS (Server Message Block/Common Internet File System) server as the second server,
wherein the HTTP server receives the authentication result from the user authentication system, and
wherein the SMB/CIFS server executes authentication process based on the second authentication data received from the user authentication system and replies with the authentication result to the user authentication system.

3. The information processing apparatus according to claim 1, wherein each of the different kinds of servers provides a different function from one another.

4. The information processing apparatus according to claim 1, wherein one of the servers communicates with a web browser of a client using HTTP (Hypertext Transfer Protocol) and another one of the servers communicates with a setting management tool of the client using a communication protocol different from HTTP.

5. The information processing apparatus according to claim 1, wherein the instructions further comprise instructions of allowing a user to log in to the information processing apparatus based on a result of the authentication processing.

6. The information processing apparatus according to claim 1, wherein each of the different kinds of servers communicates with a client using a different communication protocol from one another, belonging to an application layer of an Open Systems Interconnection (OSI) reference model.

7. The information processing apparatus according to claim 1, wherein
the obtained authentication processing method includes a calculation method for calculating a hash value from the obtained credential, and
the instructions further comprise instructions of converting the obtained credential into the hash value in accordance with the calculation method included in the obtained authentication processing method.

8. The information processing apparatus according to claim 1, wherein the instructions further comprise instructions of notifying the server corresponding to the request of an authentication error in a case where the obtaining of the credential from the user information storage unit has failed.

9. The information processing apparatus according to claim 1, wherein the instructions further comprise instructions of notifying the server corresponding to the request of an authentication error in a case where a validity of the obtained credential is expired.

10. The information processing apparatus according to claim 1, wherein the instructions further comprise instructions of receiving a user identifier and a password from a user via the local UI for inputting credentials,
wherein, in a case where the user identifier and the password are received from the user via the local UI of the information processing apparatus, the authentication processing is executed using the received password without converting the password into a hash.

11. The information processing apparatus according to claim 1, wherein the instructions further comprise instructions of recording a result of the authentication processing.

12. The information processing apparatus according to claim 1, wherein the information processing apparatus is a multifunction peripheral.

13. The information processing apparatus according to claim 1, wherein
the user information storage unit stores a last update date or time of the obtained credential, and
in the performing of the authentication processing, whether or not a validity of the obtained credential is expired is determined by the user authentication system based on the update date or time, and in a case where the validity of the obtained credential is expired, an error is returned to the server corresponding to the request.

14. The information processing apparatus according to claim 1, wherein the obtained credential is a password, and, in the performing of the authentication processing, whether or not the obtained password as a credential satisfies a predetermined complexity setting of the password is determined by the user authentication system, and in a case where the obtained password does not satisfy the predetermined complexity setting, an error is returned to the server corresponding to the request.

15. The information processing apparatus according to claim 7, wherein the first and second authentication data generated by the user authentication system are hash values based on the obtained credential.

16. The information processing apparatus according to claim 1, wherein the instructions further comprise instructions of determining whether or not a user identifier satisfies a policy in a case that the user identifier is received from the first server or the second server, of replying with the result of authentication processing to the first server when the user identifier from the first server satisfies the policy, and of replying with the generated authentication data to the second server when the user identifier from the second server satisfies the policy.

17. A method of controlling an information processing apparatus that comprises a plurality of different kinds of servers each of which communicates with an application different from that of the other servers using a communication protocol different from that of the other servers, a local UI (user interface) that provides a user interface for providing a user with functions including at least a print function of the information processing apparatus, wherein the user interface is displayed on a display unit of the information processing apparatus, and an authentication information memory that stores authentication processing methods for each of the plurality of servers, the method comprising:
storing, in a user information memory, at least one credential associated with a user identifier, wherein the at least one credential is common among the plurality of different kinds of servers;
receiving a request for authentication processing of a user for one of the servers, the request including a user identifier associated with the user;
obtaining, from the authentication information memory, an authentication processing method for the server for which authentication processing is requested;
obtaining a credential stored in the user information memory that is associated with the user identifier included in the request; and
providing a user authentication system that performs the authentication processing using the obtained credential in accordance with the obtained authentication processing method of the server, wherein, in a case where the user authentication system receives a user identifier for performing authentication processing from a first server among the plurality of servers, the user authentication system generates first authentication data using the obtained credential that is common among the plurality of different kinds of servers, performs the authentication processing for the user using the first authentication data, and replies with a result of authentication processing to the first server, in a case where the user authentication system receives a request for performing authentication processing from a second server among the plurality of servers, the user authentication system generates, using the obtained credential that is common among the plurality of different kinds of servers, second authentication data necessary for the second server to perform the authentication processing for a user corresponding to the user identifier received from the second server and to reply an authentication result to the user authentication system, and replies with the authentication data to the second server, and in a case that the user authentication system receives a user identifier for performing authentication processing via the local UI, the user authentication system performs the authentication processing for the user using the obtained credential that is common among the plurality of different kinds of servers and replies with a result of the authentication processing to the local UI.

18. A non-transitory computer-readable storage medium storing a program that when executed causes a computer to perform a method of controlling an information processing apparatus that comprises a plurality of different kinds of servers each of which communicates with an application different from that of the other servers using a communication protocol different from that of the other servers, a local UI (user interface) that provides a user interface for providing a user with functions including at least a print function of the information processing apparatus, wherein the user interface is displayed on a display unit of the information processing apparatus, and an authentication information memory that stores authentication processing methods for each of the plurality of servers, the method comprising:

storing, in a user information memory, at least one credential associated with a user identifier, wherein the at least one credential is common among the plurality of different kinds of servers;

receiving a request for authentication processing of a user for one of the servers, the request including a user identifier associated with the user;

obtaining, from the authentication information memory, an authentication processing method for the server for which authentication processing is requested;

obtaining a credential stored in the user information memory that is associated with the user identifier included in the request; and providing a user authentication system that performs the authentication processing using the obtained credential in accordance with the obtained authentication processing method of the server, wherein, in a case where the user authentication system receives a user identifier for performing authentication processing from a first server among the plurality of servers, the user authentication system generates first authentication data using the obtained credential that is common among the plurality of different kinds of servers, performs the authentication processing for the user using the first authentication data, and replies with a result of authentication processing to the first server, in a case where the user authentication system receives a user identifier for performing authentication processing from a second server among the plurality of servers, the user authentication system generates, using the obtained credential that is common among the plurality of different kinds of servers, second authentication data necessary for the second server to perform the authentication processing for a user corresponding to the user identifier received from the second server and to reply an authentication result to the user authentication system, and replies with the authentication data to the second server, and in a case that the user authentication system receives a user identifier for performing authentication processing via the local UI, the user authentication system performs the authentication processing for the user using the obtained credential that is common among the plurality of different kinds of servers and replies with a result of the authentication processing to the local UI.

* * * * *